(12) United States Patent
Gehrmann et al.

(10) Patent No.: US 10,063,586 B2
(45) Date of Patent: Aug. 28, 2018

(54) METHODS, NODES AND COMPUTER PROGRAMS FOR REDUCTION OF UNDESIRED ENERGY CONSUMPTION OF A SERVER NODE

(71) Applicant: TELEFONAKTIEBOLAGET L M ERICSSON (PUBL), Stockholm (SE)

(72) Inventors: Christian Gehrmann, Lund (SE); Göran Selander, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 71 days.

(21) Appl. No.: 14/902,316

(22) PCT Filed: Jul. 2, 2013

(86) PCT No.: PCT/SE2013/050850
§ 371 (c)(1),
(2) Date: Dec. 30, 2015

(87) PCT Pub. No.: WO2015/002583
PCT Pub. Date: Jan. 8, 2015

(65) Prior Publication Data
US 2016/0142436 A1     May 19, 2016

(51) Int. Cl.
*H04L 29/06* (2006.01)
*H04W 12/12* (2009.01)

(52) U.S. Cl.
CPC ........ *H04L 63/1441* (2013.01); *H04L 63/123* (2013.01); *H04L 63/1458* (2013.01);
(Continued)

(58) Field of Classification Search
CPC ............... H04L 63/1441; H04L 63/123; H04L 63/1458; H04L 63/0236; H04L 2463/061; H04W 12/12
See application file for complete search history.

(56) References Cited

U.S. PATENT DOCUMENTS

2004/0260968 A1* 12/2004 Edwards ................. G06F 21/64
                                                                  714/4.1
2007/0064939 A1*  3/2007 Huh ..................... H04N 7/1675
                                                                  380/201
(Continued)

OTHER PUBLICATIONS

International Search Report dated Jul. 11, 2014, in International Application No. PCT/SE2013/050850, 6 pages.
(Continued)

*Primary Examiner* — Ghodrat Jamshidi
(74) *Attorney, Agent, or Firm* — Rothwell, Figg, Ernst & Manbeck, P.C.

(57) ABSTRACT

A method, computer program and a server node (100) in a communications network (50) for reduction of undesired energy consumption of the server node (100), the method comprising: receiving a request message from a client (120), the request message containing message fields comprising at least a message ID field and an integrity indication field containing a first integrity indication, determining a relation key by performing a calculation by usage of a master key commonly known by the server node (100) and an authorization engine (110) and at least data comprised in the message ID field, calculating a second integrity indication based on a subset of the message fields by usage of the relation key, wherein the subset excludes at least one message field that is predictable by a trusted client (120), verifying the subset of the message fields by comparing the first and second integrity indications, and determining the message to be authorized when the comparison indicates equality, and wherein when the message is not authorized, suppressing reception of the message.

10 Claims, 8 Drawing Sheets

(52) U.S. Cl.
CPC ......... *H04W 12/12* (2013.01); *H04L 63/0236* (2013.01); *H04L 2463/061* (2013.01)

(56) References Cited

U.S. PATENT DOCUMENTS

| | | | |
|---|---|---|---|
| 2007/0076885 A1* | 4/2007 | Sood | H04L 63/123 380/270 |
| 2008/0112563 A1* | 5/2008 | Choi | H04L 9/0869 380/44 |
| 2008/0178294 A1 | 7/2008 | Hu et al. | |
| 2010/0115059 A1* | 5/2010 | Youill | G07F 17/32 709/219 |
| 2011/0069668 A1* | 3/2011 | Chion | H04L 1/1829 370/329 |
| 2014/0334300 A1* | 11/2014 | Horihata | H04L 12/40039 370/230 |

OTHER PUBLICATIONS

Rahman et al. "Group Communication for CoAP, draft-ietf-core-groupcomm-05" CoRE Working Group, 2013, 33 pages.
Ma et al. "Stateful Observation in CoAP, draft-ma-core-stateful-observe-02" CoRE Working Group, 2013, 17 pages.
Gehrmann "Topics in Authentication Theory" Ph.D. Thesis, Department of Information Technology, Information Theory Group Lund University, 1997, 6 pages.
Martin et al. "Denial-of-Service Attacks on Batter-Powered Mobile Computers" Virginia Tech, Dept. of ECE, 2013, 10 pages.
Bhattasali et al. "Sleep Deprivation Attack Detection in Wireless Sensor Network" International Journal of Computer Applications, (0975-8887), vol. 40, No. 15, 2012, pp. 19-25.
Shelby et al. "Constrained Application Protocol (CoAP), draft-ietf-core-coap-18" CoRE Working Group, 2013, 118 pages.
Rescorla et al. "Datagram Transport Layer Security Version 1.2" Internet Engineering Task Force (IETF), 2012, 32 pages.

* cited by examiner

METHODS, NODES AND COMPUTER PROGRAMS FOR REDUCTION OF UNDESIRED ENERGY CONSUMPTION OF A SERVER NODE

CROSS REFERENCE TO RELATED APPLICATION(S)

This application is a 35 U.S.C. § 371 National Phase Entry Application from PCT/SE2013/050850, filed Jul. 2, 2013, designating the United States, the disclosure of which is incorporated herein in its entirety by reference.

TECHNICAL FIELD

The present disclosure relates generally to methods, nodes and computer programs performed by the nodes in a communications network for reduction of undesired energy consumption of a server node.

BACKGROUND

The number of servers connected to communications networks are increasing. Historically servers has been relative a small number of large machines serving a larger number of clients. However, there are variants growing to this structure, with potentially a large number of light servers serving clients. The clients may be client devices handled be single users, but clients may also be large data retrieving systems in data centers or cloud solutions. The servers may be grid connected servers with a perceived infinite energy supply, energy which however is a limited resource on earth. The servers may also be wirelessly connected servers which are supplied from an energy storage located with the server. The energy storage may be a battery, a capacitor, a tank for feed of a fuel cell or generator similar solutions where the energy is provided from a local source. The servers may also be wirelessly connected servers which are supplied from a limited energy supply, for example a solar panel or wind turbine. When an energy storage is exhausted, it may need to be reloaded or replaced. Such replacement may though be a task of various magnitude or complexity, for example depending of the numbers of servers, the location of a server, or if a server for example is located in a human body and may require surgery for replacement of the energy storage.

Cautious energy usage is of interest for any solutions, including grid connected servers. For servers wirelessly connected to a network, with the energy storage located near or within the server, the operational time is limited by the energy storage, before maintenance is required. Therefore preserving the energy is desired.

Recently, it has been discovered that the limitations of an energy storage located with a wirelessly connected server may be used by elements such as criminals or other individuals or organizations with a goal to sabotage. The elements may purposely put a work load on a server, with the goal to drain the energy storage. The element may not get access to the server, but just handling the requests costs the server undesired energy resources. Such attacks may also be known as DoS-attacks, denial-of-service attacks, flood-attacks, or similar. Wireless servers may be quite vulnerable for such attacks, but also grid connected servers may be caused problems.

Therefore, it is a problem to prevent purposely malicious energy drainage of servers, or to prevent attacks with the purpose to drain servers' energy storage, or attacks with purpose to cause an energy overload. Another problem is that drainage of the energy storage in a wirelessly connected server, may limit the operational time, to a shorter time than intended. Another problem with malicious intended requests is that such energy overload may be causing problems with cooling e.g. in a server farm. The servers connected to the communications network are still intended to be enabled to communicate with other units with honest intentions, i.e. another problem is to maintain communication with friendly units but avoid malicious attackers. Yet another problem is where a client may malfunction and uncontrolled starts to transmit requests. If it in such a case is a powerful or centrally located client, or if a server happens to be of sensitive nature, the malfunctioning client may cause severe damage.

SUMMARY

It is an object of the invention to address at least some of the problems and issues outlined above. It is possible to achieve these objects and others by using a method and an apparatus as defined in the attached independent claims.

According to one aspect, a method performed by a server node in a communications network for reduction of undesired energy consumption of the server node is provided. The method comprises receiving a request message from a client, the request message containing message fields comprising at least a message ID field and an integrity indication field containing a first integrity indication. The method comprises determining a relation key by performing a calculation by usage of a master key commonly known by the server node and an authorization engine and at least data comprised in the message ID field. The method comprises calculating a second integrity indication based on a subset of the message fields by usage of the relation key, wherein the subset excludes at least one message field that is predictable by a trusted client. The method comprises verifying the subset of the message fields by comparing the first and second integrity indications. The method comprises determining the message to be authorized when the comparison indicates equality, and wherein when the message is not authorized, suppressing reception of the message.

An advantage of the solution is an efficient DoS mitigation by an early drop of unauthorized requests without consuming too much resources in the process of performing this verification. A lightweight checkpoint may be provided by the solution. Thereby enabling reduction of undesired energy consumption.

According to another aspect, a server node in a communications network adapted to reduce undesired energy consumption of the server node is provided. The node is arranged to receive a request message from a client by a communication unit, the request message containing message fields comprising at least a message ID field and an integrity indication field containing a first integrity indication. The node is arranged to determine a relation key by performing a calculation by usage of a master key commonly known by the server node and an authorization engine and at least data comprised in the message ID field. The node is arranged to calculate a second integrity indication based on a subset of the message fields by usage of the relation key, wherein the subset excludes at least one message field that is predictable by a trusted client. The node is arranged to verify the subset of the message fields by comparing the first and second integrity indications. The node is arranged to determine the message to be authorized when the comparison indicates equality, and wherein when the message is not authorized, the node is arranged to suppress reception of the message.

An advantage is that resource owners, through its allowance or disallowance of access, may control how the available resources are used throughout the lifetime of the server node. By an efficient mechanism for mitigation requests causing Denial-of-Service, instruments for power management may include number of concurrent requests, total number of allowed requests per time interval etc. Thereby enabling reduction of undesired energy consumption.

According to another aspect, a method performed by a client in a communications network for enabling reduction of undesired energy consumption of a server node is provided. The method comprises determining a relation key. The method comprises retrieving an initial message ID from an authorization engine. The method comprises determining a first integrity indication based on the relation key and the initial message ID. The method comprises transmitting a request message to the server node, the request message containing message fields comprising at least a message ID field and a first integrity indication field containing the first integrity indication. The method comprises receiving a response from the server node.

According to another aspect, a client in a communications network adapted to enable reduction of undesired energy consumption of a server node is provided. The client is arranged to determine a relation key by a processor. The client is arranged to receive an initial message ID from an authorization engine by a network interface. The client is arranged to determine a first integrity indication based on the relation key and the initial message ID. The client is arranged to transmit a request message to the server node by the network interface, the request message containing message fields comprising at least a message ID field and a first integrity indication field containing the first integrity indication. The client is arranged to receive a response from the server node by the network interface.

According to another aspect, a method performed by a calculation unit in a communications network for enabling reduction of undesired energy consumption of a server node is provided. The method comprises determining a relation key by performing a calculation by usage of a master key, or a master relation key, and at least data comprised in a message (m) ID field. The method comprises splitting the relation key into two parts: a and b. The method comprises determining a dynamic value c updated for each message (m) in a relation. The method comprises calculating an integrity indication by usage of a Galois Field Transformation: $v_i=(m\_0_i+a*m\_1_i)*b+c_i$. The method comprises providing the integrity indication to a server node, or a client.

According to another aspect, a calculation unit in a communications network for enabling reduction of undesired energy consumption of a server node is provided. The node is arranged to determine a relation key by performing a calculation by usage of a master key, or a master relation key, and at least data comprised in a message (m) ID field. The node is arranged to split the relation key into two parts: a and b. The node is arranged to determine a dynamic value c updated for each message (m) in a relation. The node is arranged to calculate an integrity indication by usage of a Galois Field Transformation: $v_i=(m\_0_i+a*m\_1_i)*b+c_i$. The node is arranged to provide the integrity indication to a server node (100), or a client (120).

According to an embodiment, the calculation unit may be arranged in a server node or client.

According to another aspect a method performed by an ID generation unit in a communications network for enabling reduction of undesired energy consumption of a server node is provided. The method comprises determining a first message ID: MID. The method comprises determine an integer: p. The method comprises determine a message ID space: n. The method comprises calculating a new message ID by usage of: new MID=MID+p mod n. The method comprises providing the new message ID to a authorization engine (110), or a client (120).

According to another aspect an ID generation unit in a communications network for enabling reduction of undesired energy consumption of a server node is provided. The node is arranged to determine a first message ID: MID. The node is arranged to determine an integer: p. The node is arranged to determine a message ID space: n. The node is arranged to calculate a new message ID by usage of: new MID=MID+p mod n. The node is arranged to provide the new message ID to a authorization engine, or a client.

According to an embodiment the ID generation unit may be arranged in an authorization engine or client.

According to another aspect, a vehicle or vessel containing a server node is provided.

According to another aspect, a body associated medical device performing a method performed by the server node is provided.

According to another aspect, a computer program comprising computer readable code is provided. The computer program which, when run on a server node, causes the server node to behave as a server node.

According to another aspect, a computer program product comprising a computer program comprising computer readable code is provided. The computer program which, when run on a server node, causes the server node to behave as a server node.

The above method and apparatus may be configured and implemented according to different optional embodiments. In one possible embodiment, the message ID and the first integrity indication may be located in the beginning of the message. In one possible embodiment, the subset may comprise at least a dynamic message field, wherein the content of the dynamic message field is changed for subsequent request messages. In one possible embodiment, the relation key may be determined by a function of: the master key, the message ID and optionally other data. One possible embodiment may comprise reception of a number of not authorized request messages, wherein when the number is above a predetermined threshold during a first predefined period of time, the communication with the client may be suppressed.

One possible embodiment may comprise reception of a number of not authorized request messages, wherein when the number is above another predetermined threshold during a second predefined period of time, the communication with the communications network may be suppressed. In one possible embodiment, the communication may be suppressed for a third predetermined time period, or the communication may be suppressed for a randomized time period. In one possible embodiment, the communication may be suppressed for a secret time period, and where the secret time period is known by the server node and the trusted client. In one possible embodiment, a subsequent request message may comprise a new message ID relative to any previous request message, or a subsequent request message may comprise a new message ID relative to any previous request message during an established relation.

In one possible embodiment, a new relation key may be determined for each subsequent request message. In one possible embodiment, the request message may be a CoAP message (Constrained Application Protocol). In one possible embodiment, the request message may be preceding the first of, or including the first message using the Transport Layer Security (TLS) protocol or the Datagram Transport Layer Security (DTLS) protocol.

An advantage with the solution is that a server node may avoid sending verification requests in scenarios where for example stateless cookies are used in DTLS. Thereby may only such requests be transmitted to clients expected to be able to respond properly to for "HelloVerifyRequest message". Thereby enabling reduction of undesired energy consumption.

An advantage may be usage of secret keys, using shifting protocol messages exchanges for cryptographic operations. When a request may be determined as invalid, such a request may be silently dropped. The solution may be using schemes with sleep schedules so that the server nodes may go to sleep a random time after a number of invalid requests.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to reduce undesired energy consumption in a server node. There are many reasons for energy consumption in a server node. Most of them have good reasons such as the design of the server node, or the work load of the server node. If it is a wireless server node, the activity on the wireless connection via a radio will influence the energy consumption.

However, an arising problem is people or organizations creating some kind of load on a server node with malicious purposes such as DoS-attacks (Denial-of-Service), where the load or attack is designed to create an abnormal energy consumption of the server node. Such attack may become critical for service maintenance, where a server node operated via a wireless connection and an energy storage co-located with the server node may be exhausted over a short period. Therefore is this solution providing some suggestions about how to solve the problems related to attacks or other malicious activities aimed at draining an energy storage, or creating an overload, of a server node. It is also desired of server nodes to minimize CPU-activity (Central Processing Unit) and to minimize receive and transmission time of the radio, because both the CPU and radio consume substantial more energy when active compared to when in a sleep mode.

The present solution suggests that requests to a server node are verified in an early stage of the reception of the request, such that any harmful requests may be early detected and thereby avoid to spend unnecessary energy resources on processing such messages. By receiving a request message and verifying some message fields, potentially located in the beginning of the message, and potentially in the first of an anticipated message exchange containing several messages, it may be possible to early determine if a message or message exchange may be originating from a trusted source or may be a harmful request.

In order to save resources and rapidly analyze a part of the message, or the first message in an message exchange and determine if the message may be trusted or not, the part of the message may be short and unique for each message, thereby saving CPU and communication resources by limiting the reception of harmful messages. If the server node detects an attack, it may suppress communication and set CPU and radio to sleep mode, and thereby not waste energy resources on messages originating from a sender or client, which is not intended to provide server requests. In the case of a message exchange protocol with several messages, the server may send a response with an error code, if required by the protocol, thereby complying with the protocol execution rules but still saving energy compared to completing the full message exchange.

Figure 1A:
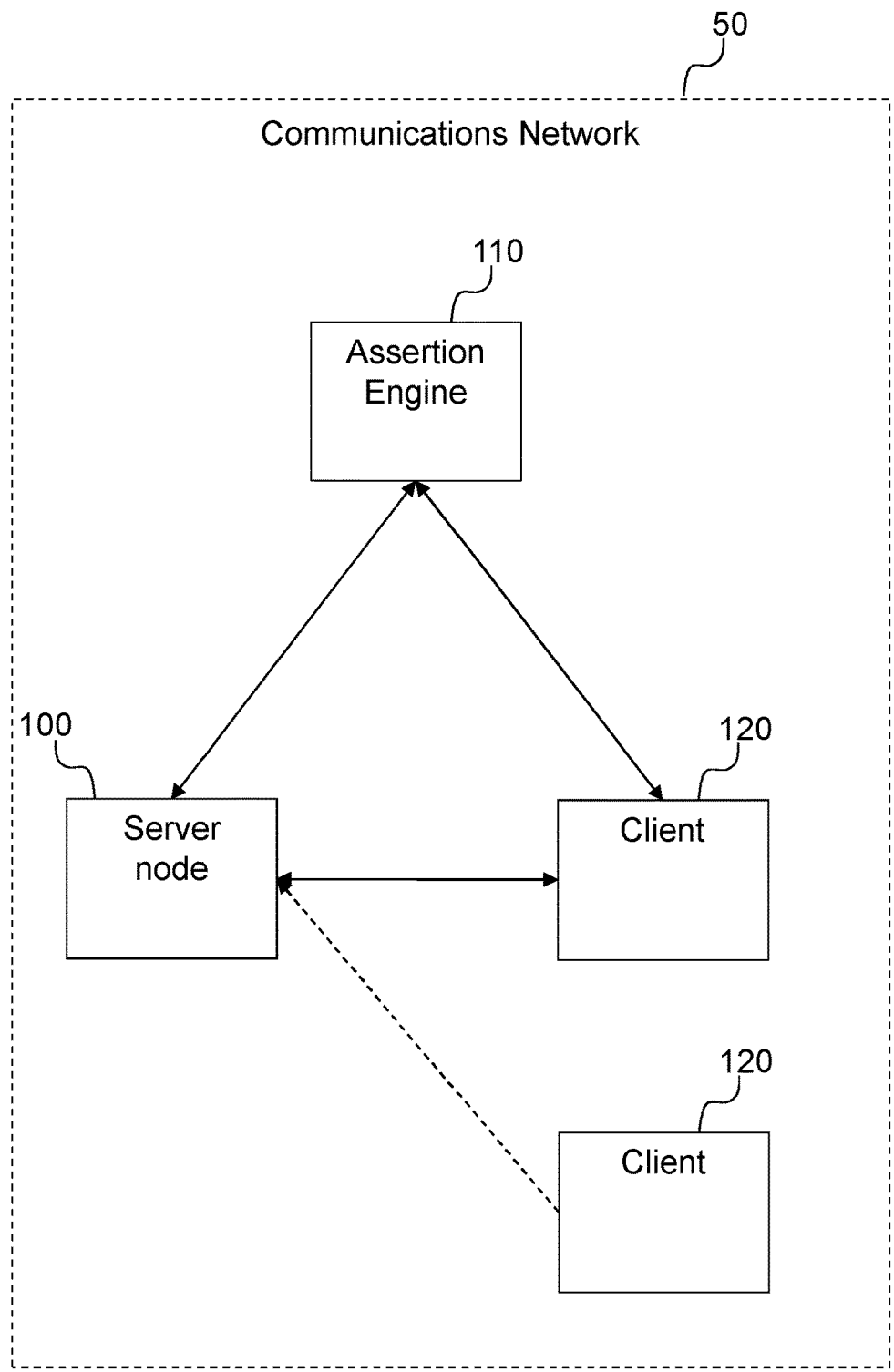
FIG. 1A is a block diagram illustrating, according to some possible embodiments.

Now the solution will be described in more detail. FIG. 1A shows a communication scenario with a server node 100, an authorization engine 110 acting as a trusted party and a client 120 for accessing the server node 100.

Figure 1B:
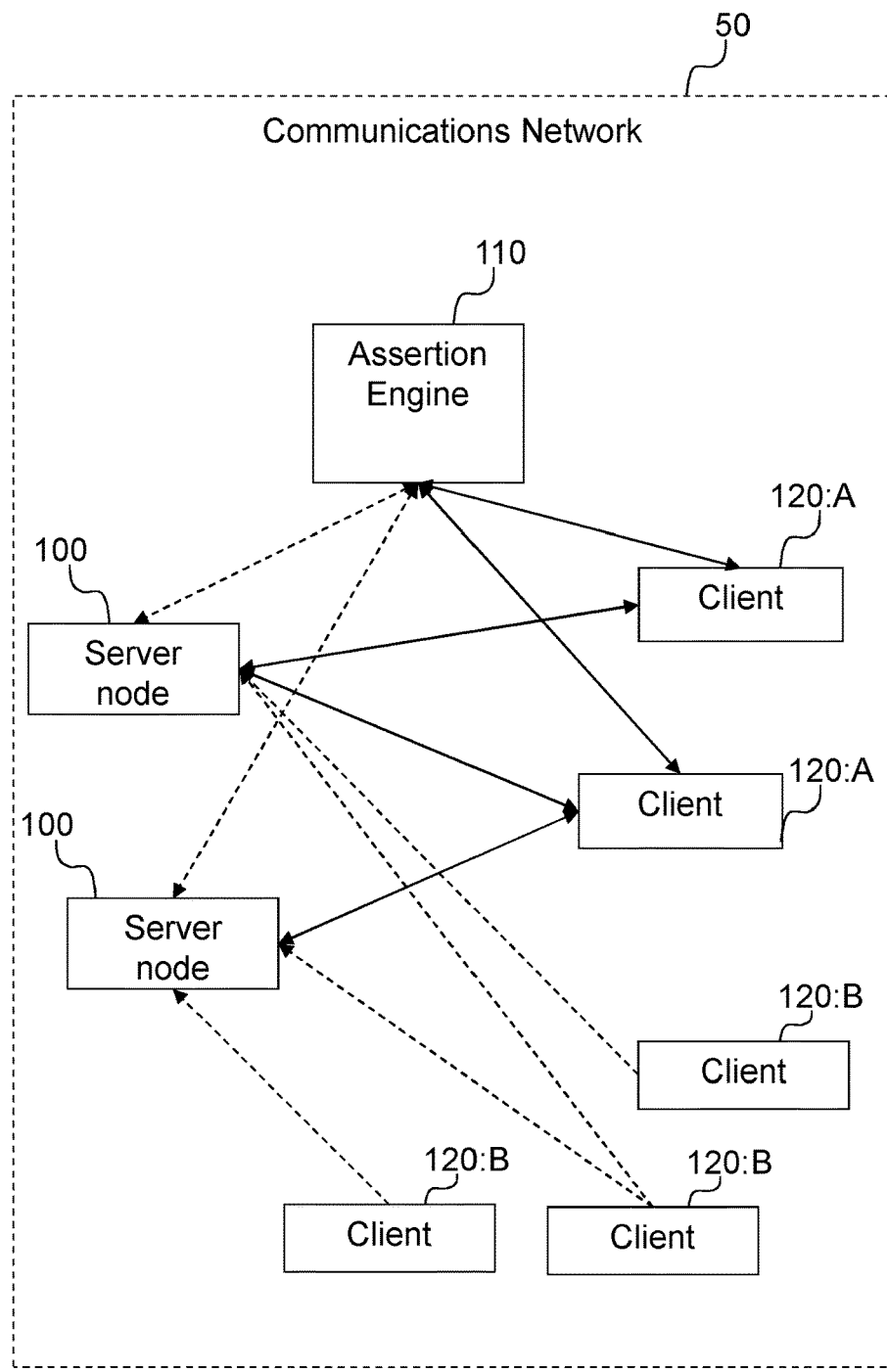
FIG. 1B is a block diagram illustrating, according to some further possible embodiments.

FIG. 1B illustrates embodiments of the solution, where a plurality of clients 120:A may be trusted to transmit request messages to the plurality of server nodes 100. For each server node 100, a client 120:A may have been provided a relation key and an initial ID from the authorization engine 110 over a potentially secure (potentially encrypted and authenticated) channel using any secure communication technique. The plurality of clients 120:B may not be trusted and may not have received any relation key. Clients 120:B transmitting request messages to the server nodes may not be receiving any responses from the server nodes 100.

Figure 2:
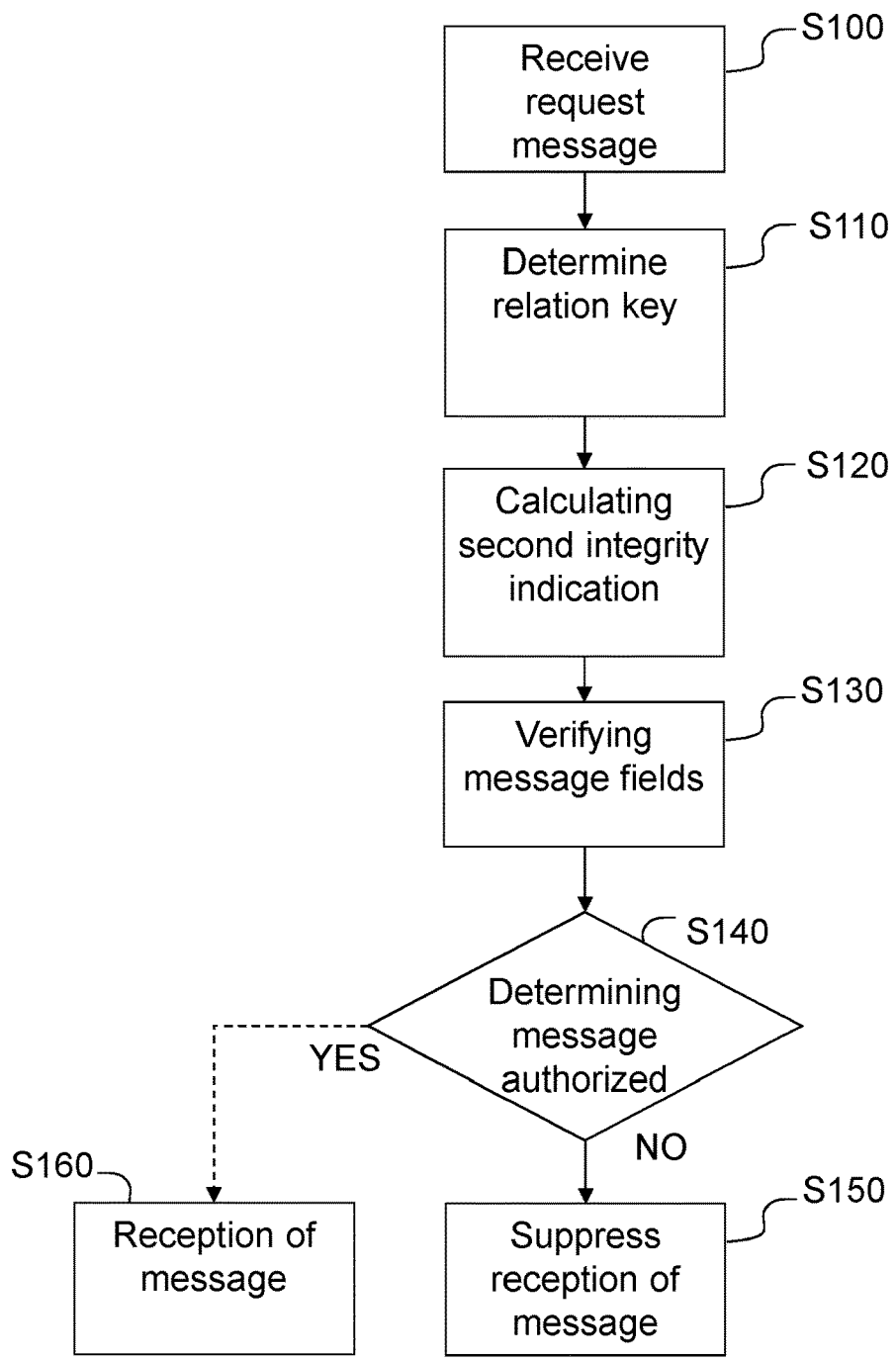
FIG. 2 is a flow chart illustrating a procedure in a server node, according to possible embodiments.

According to an embodiment, exemplified by FIG. 2, a method performed by a server node 100 in a communications network 50 for reduction of undesired energy consumption of the server node 100 is provided. The method comprises reception of a request message in a step (S100) from a client 120. The request message contains message fields comprising at least a message ID field and an integrity indication field containing a first integrity indication. The method comprises determination of a relation key in step (S110) by performing a calculation by usage of a master key commonly known by the server node and an authorization engine 110 and at least data comprised in the message ID field. The method comprises calculation of a second integrity indication in a step (S120) based on a subset of the message fields including the message ID field by usage of the relation key, wherein the subset excludes at least one message field that is predictable by a trusted client 120. The method comprises verification of the subset of the message fields in step (S130) by comparing the first and second integrity indications. The method comprises determination of the message to be authorized in step (S140) when and only when the comparison indicates equality, and wherein when the message is not authorized, reception of the message is suppressed in step (S150). The method comprises reception of the request message in step (S160), when the request message was determined authorized.

A communications network 50 may be for example a public telephony network, data network, local area network, personal area network, the Internet, not limiting to other similar types of communications network. A server node 100 may be a grid connected server, operated in a data center, a server in a cloud based solution or a standalone server. A server node 100 may be a light weight server connected by wire or wirelessly operated, for example a server node connected to a temperature sensor serving clients temperature data, or a security surveillance/alarm server in a building, a medical device connected to or body internal, or a vehicle such as a car or boat.

A server, such as the server node 100 may always need some energy for operation. Energy is needed for the CPU, memory, communications interface, etc. Various measurements may be taken to preserve energy, such as decreasing the CPU clock frequency during periods of lower workload, if it is a wireless communications interface, setting the radio in sleep mode, etc. This may be considered normal energy consumption in order to serve various services and trusted clients. Undesired energy consumption contrary from normal energy consumption, may be energy consumption for non-beneficial services. If a fault occurs in the communications network or a user accidentally makes a mistake, such may generate request messages to a server node 100. Undesired energy consumption may also be a result of a harmful client 120, trying to sabotage the server node 100 by creating some kind of workload in the server node 100, including so-called Denial-of-Service attempts (DoS).

An integrity indication may be the output of a function performed on selected message fields and a key with the design objective of being unpredictable without knowledge of the key, different for different messages or groups of messages and less costly in terms of execution time, output length, or shorter compared to a traditional Message Authentication Code (MAC). The integrity indication thus may have different properties compare to those MACs widely used in Internet protocols today. It may only cover selected, potentially few, message fields, so the integrity of other fields is not measured and it is relatively short in length which means that the probability of a successful random attack (randomly chosen MAC value) not is negligible. However, on the other hand the integrity indication algorithm may be chosen to be unconditionally secure, i.e., the probability of a successful attack on the algorithm even if the integrity indication is rather short, can be pre-calculated and an attacker will independent of computing power not have any greater success rate than a random attack. An integrity indication may be data useful for verifying the integrity of a part of the message. The integrity indication may be used for determination of that a message request probably is originating from a trusted client 120. When a server node 100 receives a first integrity indication included in the request message, it may calculate a second integrity indication, based on the part of the message, for example a subset of the message fields, and the master relation key.

A predictable message field may be a message field part of a message transmitted by a client 120, where the client 120 may predict that the content of the message field not will be naturally changed through the transmission. Some message fields are naturally changed through transmission, such as time stamp fields, proxy server handling, and similar. Calculating integrity of a message may therefore only be performed on content of message fields which may be predicted to be received by a receiver of the message. A static message field, which is not expected to change as part of normal protocol execution, is trivially predictable.

According to an embodiment of the solution, at least one message field that is predictable by the client 120 may be excluded in the calculation of an integrity indication. Obviously more than one field may be excluded, an embodiment may be that the calculation of the integrity indication is performed on only one message field such as the message ID. Thereby will a receiver of an integrity indication, in this case the server node 100, only get an indication of the integrity on a subset of the predictable message fields which have been included in the calculation of the integrity indication, i.e. the server node 100 will not verify the integrity of all predictable message fields. Hence, all message fields not included in the calculation of the integrity indication may be changed by an attacker without being detected by verifying the integrity indication. The length of the integrity indication (output length of the algorithm calculating the integrity indication, may be relatively short compared to traditional MAC causing the effect that it may be feasible to forge by generating a random integrity indication. The latter two properties indicate the weaknesses of relying only on the integrity indication as a proof of integrity, which is not its purpose. Rather the integrity indication gives a first indication of the integrity of the message which enables the receiving server node 100 to discard a large proportion of unauthorized requests and only allow a set of requests authorized for further processing. Since the integrity indication may be not replacing an integrity verification it adds an additional computational cost at each message reception and therefore advantageously may be designed to be substantially less costly in terms of execution time compared to a traditional MAC. An example of a predictable message field may be the field containing the message ID, not limiting other message filed or fields to be included.

According to an embodiment of the solution, the terms "authorized" or "is authorized" in the context of this description may have the meaning of authorized for further processing. This means that when a message is determined as authorized, it may not be completely authorized, but at least authorized for further processing, such as other steps of authorization or other validation. According to an embodiment of the solution, a short length of the integrity indication may be selected. A short integrity indication may be defined as shorter than a particular number of bits, for example shorter than 128, 64, 33 or 17 bits.

An advantage with at least one message field predictable by the client excluded from the calculation of the integrity indication, in combination with a short integrity indication, is that it may be fast and CPU-efficient to calculate.

Another advantage may be that the server node 100 which receives a request message from a client 120, may be enabled to quickly determine if a message or message exchange not is authorized, and as soon as possible suppress further communication and thereby reduce undesired energy consumption.

The master key is a key commonly known by both the server node 100 and the authorization engine 110. The master key may be provisioned at manufacturing of the server node 100, or as part of the distribution or installation process of the server node 100, or at some stage of the operation of the server node 100. The master key may be possible to change. Such a change may be initiated by the server node 100, by the authorization engine 110, or a third party. The authorization engine 110 may comprise a database of master keys provisioned to various server nodes 100. The authorization engine 110 may comprise a service providing functionality. The authorization engine 110 may authenticate, authorize and establish a secure connection with the client 120. The authorization engine 110 may for example be providing the client 120 with an initial ID or seed for enabling the client to create an initial ID. The authorization engine 110 may be providing the client 120 with a relation key. The authorization engine 110 may be providing the client 120 with a master relation key, such that the client 120 may be capable to derive relation keys by itself.

A client 120 may be some kind of client device such as a personal computer, mobile device, or similar device. A client 120 may be another server or similar network unit. The client 120 may be requesting information from the server node 100 or providing information to the server node 100, or ask for performance of various other operations, not limiting the client 120 requesting the server node 100 for other services. The client 120 may communicate with the authorization engine 110 using one communication technology and communicate with the server node 100 using another communication technology. The authorization engine 110 and the server node 100 need not share a common communication technology.

According to an embodiment of the method, the message ID and the first integrity indication may be located in the beginning of the message. The message ID and the first integrity indication may be located in the beginning as part of a message header. The message ID and the first integrity indication may be located in the beginning as part of a message body. In this context, beginning may be interpreted as the first half of a message. The message ID and the first integrity indication may be located in the beginning of the message to enable authorization of the message as early as possible of the message reception. An advantage of that is avoidance of further message interpretation, if the message may be determined not authorized. Placing the message ID and the first integrity indication in a part of the message that is early received by the receiver gives a possibility to suppress the continued reception of the message before the whole message is received and thereby save energy.

According to an embodiment, the integrity indication may be generated by usage of at least a dynamic message field, wherein a subset of the dynamic message field may be changed for subsequent request messages. An example of a dynamic field is the message ID. In this context a "message field" is to be regarded as any part of the message, not only parts particularly identified for a definite purpose. The message field may be composed of different parts, some static fields and some dynamic fields. A dynamic field may be changed between individual messages. A dynamic field may be changed between a groups of messages. A group of messages may also be described as a number of messages within a relation, where the relation is established between a server node 100 and a client 120. The relation may be terminated after a certain period, or after a certain period of inactivity or after some predetermined occasion.

A subset of a message field may be unchanged within an established relation, but updated between relations. In an embodiment, the integrity indication may be in a range of 1 to 16 bits long. In an embodiment, the integrity indication may be in a range of 1 to 32 bits long. In an embodiment, the integrity indication may be in a range of 1 to 64 bits long.

According to an embodiment the relation key may be determined by a function of: the master key (MK), the message ID and optionally other data.

According to an embodiment the master key (MK) is used to generate a relation master key (RMK), through for example using a properly chosen pseudo random function (PRF), and a fixed agreed constant value, const, of sufficient length.

RMK=PRF(MK,const).

The master key may be used to produce the relation master key or directly the relation key used to verify request messages. Hence, the master key may need to be updated with some regularity through an update procedure between the authorization engine 110 and the server node 100. A client 120 which is in a process to transmit a first request message to a server node 100, may contact the authorization engine 110 to get an authorization with the right to access the particular server node 100, may be provided a relation master key, RMK and may also be provided the message ID for the first message to be used in the relation with the server node 100. According to an embodiment the initial input for the relation key calculation (RK) is calculated as:

RK=PRF(RMK,Message_ID),

According to an embodiment, the relation key, $K_R$, may consist of a sequence of key values generated according to the following function:

$K_{R0}$=RK, $K_{R1}$=PRF($K_{R0}$), $K_{R2}$=PRF($K_{R1}$),

.

.

.

$K_{Rj}$=PRF($K_{Ri-1}$).

Assume that the integrity indication and the message scope may be short, it may be possible to utilize a construction for unconditionally secure message authentication for calculating the integrity indication which may be efficient, given that key material also can be produced fairly efficiently [13].

Denote by $GF(2^{16})$ a Galois field with a size 16 bits. A Galois field (also called a finite field) is a field that contains a finite number of elements. Galois fields are frequently used in abstract algebra. Furthermore, assume that each message exchange may be enumerated in one particular message exchange sequence ("relation") as 1, 2, . . . , n and that the message exchange index is denoted by i. Throughout this description, the term "session" may also be used for the term "relation". Some protocols may not include a session concept, each message exchange (request/response) may have a certain Message ID, and the next exchange should have a different Message ID. A "session" may be a sequence of message exchanges between the same server node 100 and client 120 over a short period of time. As discussed in earlier sections, e.g. [00043-00045], a keying scheme may be used. For the integrity indication calculation, it may be assumed that the key to be used may consist of three pieces, (how to map the key material to these three pieces is discussed later, e.g. in [00049]):

a∈GF($2^{16}$)—16 bit key value unchanged for a complete session
b∈GF($2^{16}$)—16 bit key value unchanged for a complete session
$c_i$∈GF($2^{16}$)—16 bit key value that is updated for each new message exchange in a session Assume the message to be used as input to the integrity indication calculation, $m_i$, be 32 bits and be represented as two 16 bits GF($2^{16}$) elements, i.e. $m_i$=m_$0_i$, m_$1_i$ GF($2^{16}$). The integrity indication $v_i$ may be then calculated as:

$$v_i=(m\_0_i+a*m\_1_i)*b+c_i$$

i.e., using just two multiplications and two additions in GF($2^{16}$)

The key material to be used by the client 120 for the previously described integrity indication calculation may be the relation key, $K_R$. According to an embodiment the mapping from the relation key material to the actual keys used in the integrity indication calculation may be as follows:
a=first 16 bits of $K_R$
b=bit number 16 until 31 of $K_R$
$c_i$=bit number (i+2 mod 16)*16 until bit number (i+2 mod 16)*16+15 in $K_{R \lfloor (i+2)/16 \rfloor}$
Where the "floor" notation $\lfloor x \rfloor$ indicates that the real number x should be rounded down to the nearest integer.

According to an embodiment a number of not authorized request messages may be received, wherein when the number is above a predetermined threshold, the communication with the client 120 may be suppressed. Thereby may some transmission errors below the predetermined threshold be tolerated, but a harmful client 120 providing more messages than the threshold indicates will be disabled to reach the server node 100.

According to an embodiment a number of not authorized request messages may be received from the client 120, wherein when the request message is determined to be received from a specific IP-address, or from a range of IP-addresses, the communication with that IP-address or the communication with addresses within that range, may be suppressed.

According to an embodiment a number of not authorized request messages may be received, wherein when the number is above another predetermined threshold, the communication with the communications network 50 may be suppressed. Thereby may some transmission errors below the predetermined threshold be tolerated, but a harmful client 120 or any client providing more messages than the threshold indicates will be disabled to reach the server node 100. It may be difficult for a server node 100 to determine if a request message is originating from a client 120, which has been individually suppressed. If potentially all communication, or all communication with the communications network 50 is suppressed, the server node will not be affected by any harmful client or client 120 requests. According to an embodiment the communication may be suppressed for a predetermined time period, or the communication may be suppressed for a randomized time period. If it is determined that a number of request messages has caused the server node 100 to suppress the communication, either suppress the communication with a client 110, or suppress the communication with the communications network 50, the server node 100 may enable communication to allow new request messages from clients 120 after the predetermined period of time. If the suppress time period is randomized, it may make it more difficult, or require additional resources from a harmful client, to create undesired energy consumption of the server node 100.

According to an embodiment the communication may be suppressed for a secret time period, and the secret time period may be known by the server node 100 and the client 120:A wherefrom request message has been authorized. By using a secret time period, which is known only by the server node 100 and the trusted client 120:A, a harmful client 120:B trying to cause undesired energy consumption of the server node 100, will need to invest larger efforts than otherwise. In a hostile environment, such as the open Internet sometimes may be, communication may be maintained between trusted clients 120:A at certain predetermined points in time, but harmful clients 120:B may from time to time meet a silent server node 100 which has suppressed the communication. There may be several advantages with such a set-up. It may be difficult to find the server node 100 at all for a harmful client 120:B. The server node 100 may be saving energy by being in sleep mode for most of the time. The harmful client 120:B may need to be very active, to be able to potentially cause the server node any measurable energy loss.

There are different ways for the server node 100 and the client 120 to inform or agree on the secret time of suppressed communication. It may be a part of the initial set-up of a relation, or when a relation has been established, the client 120 may be informed about the secret time period. The secret time period may be also conveyed with each previous response.

Combinations of basis for suppressing communications is possible, e.g. number of received request messages, source-IP-address of requesting client 120, time periods, not limiting other similar parameters for suppressing communication.

According to an embodiment a subsequent request message may comprise a new message ID relative to any previous request message, or a subsequent request message may comprise a new message ID relative to any previous request message during an established relation.

According to an embodiment a subsequent request message may comprise an equal message ID relative to a previous request message, wherein a new relation key is determined for each subsequent request message.

Message ID's may be generated in different ways. According to an embodiment, in an exemplifying scenario an authorization engine 110 is distributing Message ID's to multiple clients 120 for use with one and the same server node 100. A non-limiting example may be illustrated according to the following. The authorization engine is choosing the very first message ID completely at random from the space of possible message IDs. Denote this this very first message ID by MID. For each new relation, independent of the requesting client 120, the authorization engine 110 calculates a new MID as follows:

$$\text{new MID}=\text{MID}+p \bmod n,$$

where p is a suitable prime integer and where n is the size of the message ID space.

When the calculated new MID may coincide with a previous Message ID, i.e. the first, then a new master relation key may be derived. The derived Message ID may be used to calculate a new relation key (RK) which is forwarded to the client 120. The client 120 may use the given Message ID in the first exchange and then add one to this Message ID for each following exchange in this relation.

A non-limiting example is the following algorithm describing how the server node 100 may evaluate messages claimed to be first the first message in a new session. The server node 100 at key reset may accept any message ID value. When the server node 100 first receives a valid message it may mark the Message ID as the current valid ID, Current_ID. When the server node 100 receives a new Message ID it may check if the Message ID is of the order of the Current_ID (say |Message_ID−Current_ID|<A). If so, the server node 100 may verify the validity of the message using the received integrity indication which proves it to be a valid message in an existing relation with the same client 120 who sent the Current_ID and the relative order of received message exchanges can be inferred. If the |Message_ID−Current_ID|=mp is a small multiple (m<B) of p mod n, it may verify the validity of the message which proves it to be the first message in a new sequence of messages from the same or new client 120.

The server node 100 may keep the very first accepted message ID for one relation master key (RMK) in memory to be able to detect when the Message_ID generation has wrapped around. If so, no more messages may be accepted until a regeneration of RMK has occurred. When a valid Message_ID larger than the Current_ID for a new session is received, that value is the new Current_ID and the acceptance window may move accordingly. If a valid message with a lower value than the Current_ID is received (still within a p multiple form Current_ID), the window will not move.

The message ID generation strategy described above may make it possible to use the whole message ID space before there is a need for generation of a new relation master key. This example may ensure that the same message ID never is reused for the same relation master key. The parameters A and B are set to handle the loss of messages in this unreliable setting. The parameter p is assumed to be fixed and known to both authorization engine 110 and server node 100.

According to an embodiment the request message is a CoAP message (Constrained Application Protocol). The request message may be an http message (Hypertext Transfer Protocol), or a SIP (Session Initiation Protocol), not limiting a request message to be other similar protocols. CoAP is a protocol used for communication with constrained wired and/or wireless servers. The solution described herein may be used in communication scenarios together with CoAP.

According to an embodiment, the request message may be preceding the first of, or including the first message using the Transport Layer Security (TLS) protocol or the Datagram Transport Layer Security (DTLS) protocol.

An advantage with the solution may be for example to protect against harmful or undesired request messages over the CoAP-protocol with as little undesired energy consumption as possible.

An advantage with the solution may be for example to protect against harmful or undesired request messages transferred using the Transport Layer Security (TLS, IETF RFC 5246) protocol, or the Datagram Transport Layer Security (DTLS, IETF RFC 6347) protocol, and potentially with reduced undesired energy consumption. Integrity protection is a security feature of many communication security protocols such as DTLS/TLS Record Protocol and IPsec. With integrity protection, all messages can be verified to be from a trusted source, the same source as was verified in the authentication and key establishment protocol preceding the secure communication, e.g. DTLS/TLS Handshake Protocol or the Internet Key Exchange (IKE, IETF RFC 5996), respectively. However, the initial messages of the authentication protocol and key exchange protocol is typically not integrity protected because 1. There are often no keys established yet with which integrity can be protected, and 2. The Message Authentication Code used for integrity verification is often not in the first message. Hence initiating security protocols may be used to maliciously trigger undesired energy consumption. In the present solution, where it is proposed to assume that a shared key can be established between client and server, it may be possible to protect against this attack by applying the method described in this solution in an early message of the authentication and key establishment protocol (ClientHello/ServerHello of DTLS/TLS or initial exchange in IKE). This may be performed by including an integrity indication in one of these messages. There are various means of embedding this information in existing message fields, or define extensions to a suitable standard. For DTLS/TLS one option is to use a TLS extension, which is a standardized way of extending the message. Another option is to use the Session ID or Random message fields. For IKE the nonces of the initial exchanges are candidate message fields.

The integrity key calculation above is based on the shared key between the server node 100 and the authorization engine 110, and the initial Message ID for a message exchange generated by the authorization engine 110.

According to an embodiment, the authorization engine 110 may delegate the mandate to generate message ID's to the client 120. An illustrative example may be according to the following. Instead of the authorization engine 110 generating Message ID's, the client 120 may be performing this task. Together with the access control decision, response and authorization, the authorization engine 110 may send a bind key KU to the client 120, where the key may be derived from the shared secret relation master key (RMK) and an identifier of the Client.

$$K_U = PRF(K_{RM}, \text{Client\_ID})$$

The identifier of the Client may be uniquely defined with the received message to enable, key derivation without any extra identifier being passed, e.g. an IP address of the Client, or hash of message or a combination thereof, not limiting other identifiers to be used. The client 120 may thus define the Message ID in a new message exchange and both client 120 and server node 100 may be enabled to derive the relation key.

$$K_R = PRF(K_U, \text{Message\_ID}),$$

The integrity indication may be calculated analogously as above. The generation of message ID's may be simplified, since it suffices that each client 120 may generate unique Message ID's until the bind key is updated. An advantage with this alternative relation key derivation scheme is that it may allow a large number of relation keys to be generated before there may be a need to update the relation master key. From a security point of view the alternative key generation scheme may give more power to the client 120 and may give the client 120 the possibility to send valid requests to the server node 100 beyond the scope of a single authorization.

Figure 5:
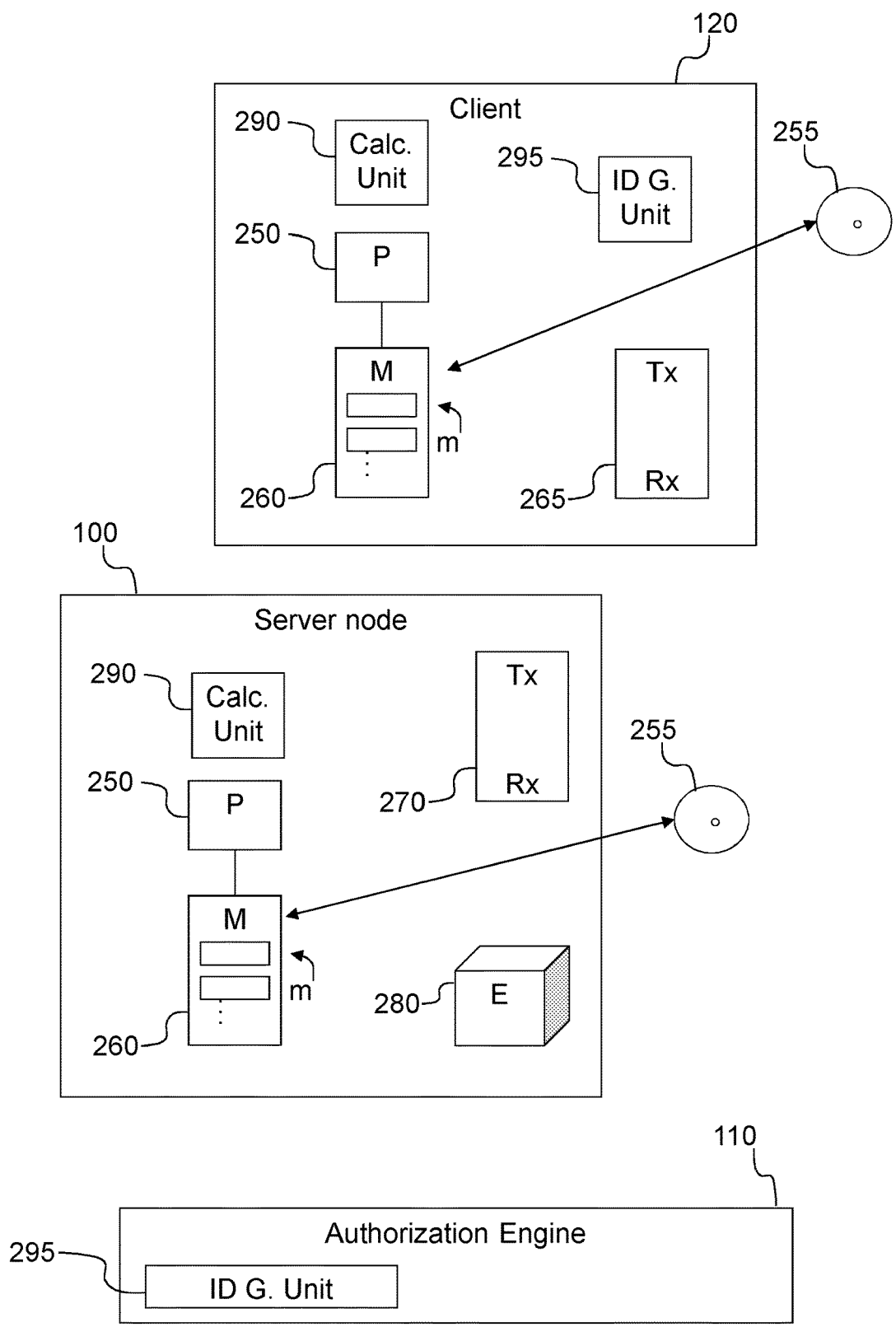
FIG. 5 is a block diagram illustrating a client, authorization engine and a server node in more detail, according to further possible embodiments.

According to an embodiment illustrated in FIG. 5, a server node 100 in a communications network 50 adapted to reduce undesired energy consumption of the server node 100 is provided. The communication unit 270 is arranged to receive a request message from a client 120, the request message containing message fields comprising at least a message ID field and an integrity indication field containing a first integrity indication. The processor 250 is arranged to determine a relation key by performing a calculation by usage of a master key commonly known by the server node and an authorization engine 110 and at least data comprised in the message ID field. The processor 250 is arranged to calculate a second integrity indication based on a subset of the message fields by usage of the relation key, wherein the subset excludes at least one message field that is predictable by a trusted client 120. The processor 250 is arranged to verify the subset of the message fields by comparing the first and second integrity indications. The processor 250 is arranged to determine the message to be authorized when the comparison indicates equality, and—wherein when the message is not authorized, arranged to suppress further reception of the message and thereby not consuming energy for receiving the whole message. No response to the message is sent which further is saving energy. The communication unit 270 is arranged to handle communication, including reception of request messages.

For a server node 100, energy consumption may be illustrated with:
- interpretation of a message, may need energy resources equal to one;
- receiving a message may need energy resources equal to ten;
- and transmitting a message may need energy resources equal to one hundred.

An advantage with the solution is that avoidance of unnecessary or non-useful messages or parts of messages, may preserve energy. Further energy is energy is preserved by not responding to messages that are not authorized.

According to an embodiment of server node 100, the message ID and the first integrity indication may be located in the beginning of the message.

According to an embodiment, the server node 100 may be arranged to generate the integrity indication by at least a dynamic message field, wherein a subset of the dynamic message field may be changed for subsequent request messages.

According to an embodiment, the server node 100 may be arranged to generate the integrity indication by at least a dynamic message ID field in the header.

According to an embodiment, the server node 100 may be arranged to determine the relation key by a function of:—the master key, the message ID and optionally other data.

According to an embodiment, the server node 100 may be arranged to receive a number of not authorized request messages by the communication unit 270, wherein when the number is above a predetermined threshold, the communication with the client 120 is suppressed.

According to an embodiment, the server node 100 may be arranged to receive a number of not authorized request messages by the communication unit 270, wherein when the number is above another predetermined threshold, the communication with the communications network 50 is suppressed.

According to an embodiment, the server node 100 may be arranged to suppress the communication for a predetermined time period of the communication unit 270, or the server node may be arranged to suppress the communication for a randomized time period of the communication unit 270.

According to an embodiment, the server node 100 may be arranged to suppress the communication for a secret time period of the communication unit 270, and the secret time period may be known by the server node 100 and clients 120 wherefrom request messages has been authorized.

According to an embodiment of the server node 100, a subsequent request message may comprise a new message ID relative to any previous request message, or a subsequent request message may comprise a new message ID relative to any previous request message during an established relation.

According to an embodiment of the server node 100, a subsequent request message may comprise an equal message ID relative to a previous request message, wherein a new relation key may be determined for each subsequent request message.

According to an embodiment of the server node 100, the request message may be a CoAP message (Constrained Application Protocol).

According to an embodiment a method performed by a client 120 in a communications network 50 for enabling reduction of undesired energy consumption of a server node 100 is provided. The method comprises determination of a relation key. The method comprises retrieval of an initial message ID from an authorization engine 110. The method comprises determination of a first integrity indication based on the relation key and the initial message ID. The method comprises transmission of a request message to the server node 100, where the request message contains message fields comprising at least a message ID field and a first integrity indication field containing the first integrity indication. The method comprises reception of a response from the server node 100.

According to an embodiment of the method performed by a client 120, the message ID and the first integrity indication may be located in the beginning of the message.

According to an embodiment of the method performed by a client 120, the integrity indication may be generated by at least a dynamic message field, wherein—a subset of the dynamic message field is changed for subsequent request messages.

According to an embodiment of the method performed by a client 120, the integrity indication may be generated by at least a dynamic message ID field in the message header.

According to an embodiment of the method performed by a client 120, the relation key may be determined by a function of:—the master key, the message ID and optionally other data.

According to an embodiment of the method performed by a client 120, a subsequent request message may comprise an equal message ID relative to a previous request message, wherein a new relation key may be determined for each subsequent request message.

According to an embodiment of the method performed by a client 120, the request message may be a CoAP message (Constrained Application Protocol),—the request message is transferred using Datagram Transport Layer Security (DTLS) protocol.

According to an embodiment illustrated in FIG. 5, a client 120 in a communications network 50 adapted to enable reduction of undesired energy consumption of a server node 100 is provided. The client is arranged to determine a relation key by a processor 250. The client is arranged to retrieve an initial message ID from an authorization engine 110 by a network interface 265. The client is arranged to determine by the processor 250 a first integrity indication based on the relation key and the initial message ID. The client is arranged to transmit a request message to the server node 100 by the network interface 265, where the request message contains message fields comprising at least a message ID field and a first integrity indication field containing the first integrity indication. The client is arranged to receive a response from the server node 100 by the network interface 265.

Figure 3:
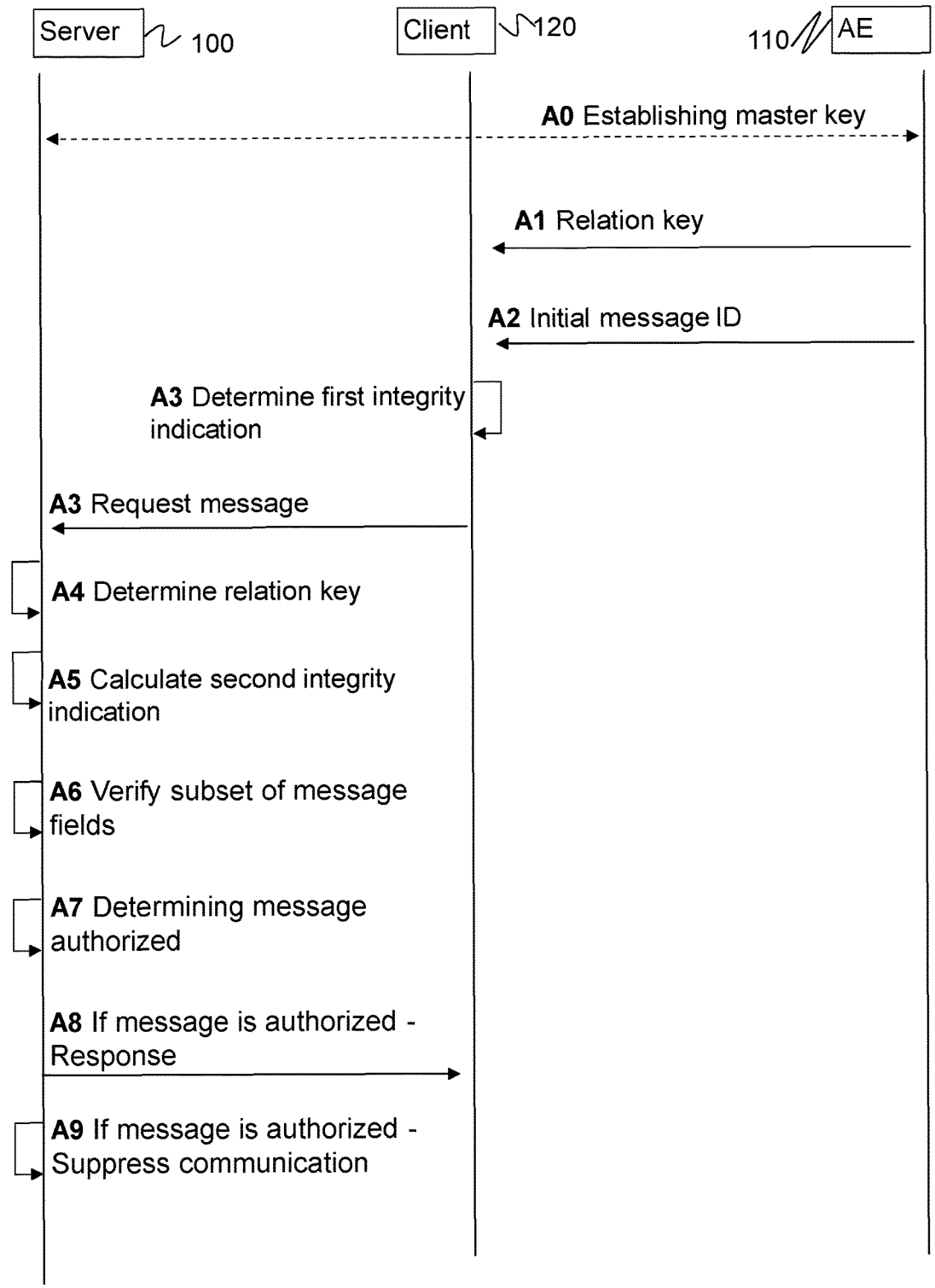
FIG. 3 is a signaling diagram illustrating an example of a procedure when the solution is used, according to further possible embodiments.

FIG. 3 illustrates a non-limiting example of a signaling diagram between a server node 100, an authorization engine 110 and a client 120. The actions described in the diagram may be preceded in a different order than showed in the figure. In an action A0 a master key may be established between the server node 100 and the authorization engine 110. In an action A1, the client 120 may retrieve a relation key from the authorization engine 110. In an action A2, the client 120 may retrieve an initial ID from the authorization engine 110. In an action A3, the client 120 may determine a first integrity indication. In an action A4, the client 120 may transmit a request message to the server node 100.

In an action A5, the server node 100 may determine a relation key. In an action A6, the server node 100 may calculate a second integrity indication. In an action A7, the server node 100 may verify the subset of the message fields. In an action A8, it may be determined if the request message is authorized. In an action A9, if the request message is authorized, the server node 100 may transmit a response to the client 120. In an action A10, if the request message is determined not authorized, the server node 100 may suppress communication with the client 120. Thereby may undesired energy consumption of the server node 100 be reduced.

According to an embodiment, the server node 100 upon determining that a client is not authorized may respond with an error code and terminate a message exchange. For example in DTLS handshake there may be four message exchanges: if the solution is applied to the first message and unauthorized requests may be detected in the first message then even sending a reply with an error message may save subsequent processing in the server.

According to an embodiment of the client 120, the message ID and the first integrity indication may be located in the beginning of the message.

According to an embodiment of the client 120, the integrity indication may be generated by at least a dynamic message field, where a subset of the dynamic message field may be changed for subsequent request messages.

According to an embodiment of the client 120, the integrity indication may be generated by at least a message ID field in the message header.

According to an embodiment of the client 120, the request message may be a CoAP message (Constrained Application Protocol), or the request message may be transferred using Datagram Transport Layer Security (DTLS) protocol.

According to an embodiment of the client 120, the integrity indication may be generated by at least a dynamic message field, wherein a subset of the dynamic message field may be changed for subsequent request messages.

According to an embodiment of the client 120, the relation key may be determined by a function of: the master key, the message ID and optionally other data.

Figure 4A:
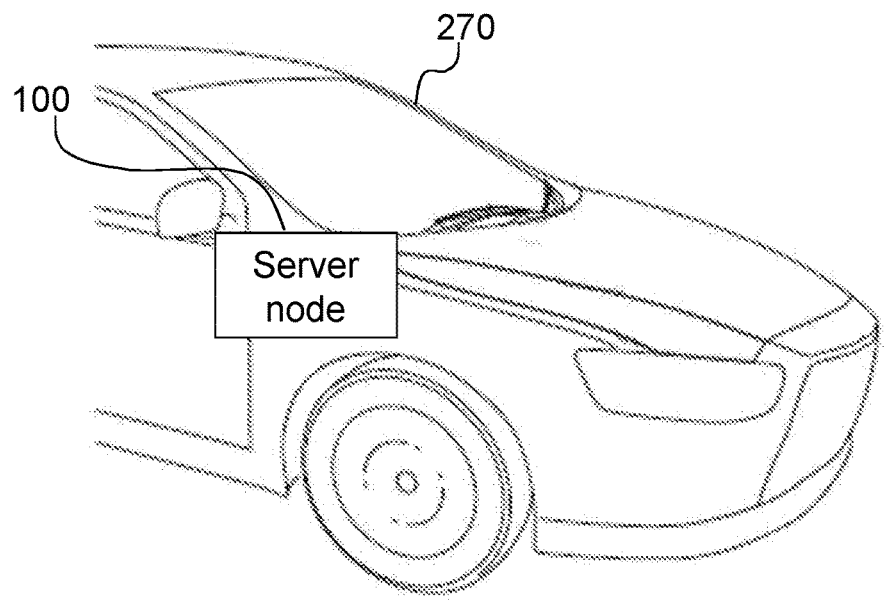
FIGS. 4A and 4B illustrates further examples of a server node in a vehicle or vessel, according to further possible embodiments.
Figure 4B:
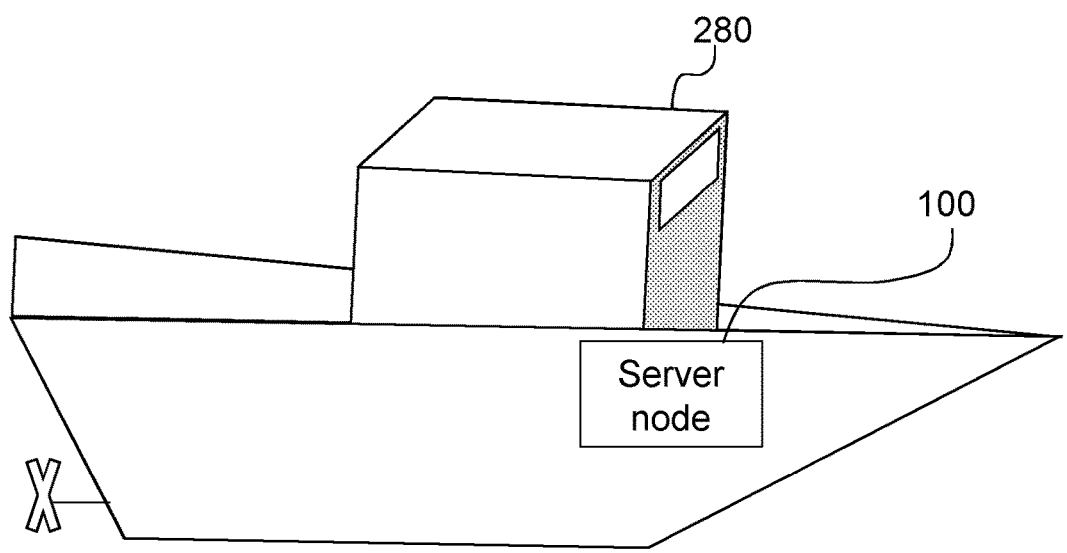

Now looking at FIGS. 4A and 4B, which shows a vehicle 270 and a vessel 280. According to an embodiment the server node 100 may be a vehicle 270 or vessel 280 containing a server node 100. Vehicles 270, such as for example cars, busses, motorcycles, trucks, camping vehicles, and similar, may contain functionality for operation, surveillance, maintenance. Also vessels 280, such as for example commercial ships for cargo or passengers, ferries, leisure boats, military ships, and similar, may contain the same or similar functionality as vehicles 270. These functionalities may be operating both during usage, as well as under rest. With an increasing tendency to connect vehicles 270 to communications networks 50, it may be an advantage to use the server node 100 and the solution provided by the server node 100 with a vehicle 270. A vehicle 270 or a vessel 280, and particularly a node in the vehicle or vessel, may not have the same resources to handle energy consumption, as server nodes in a data center.

Figure 4C:
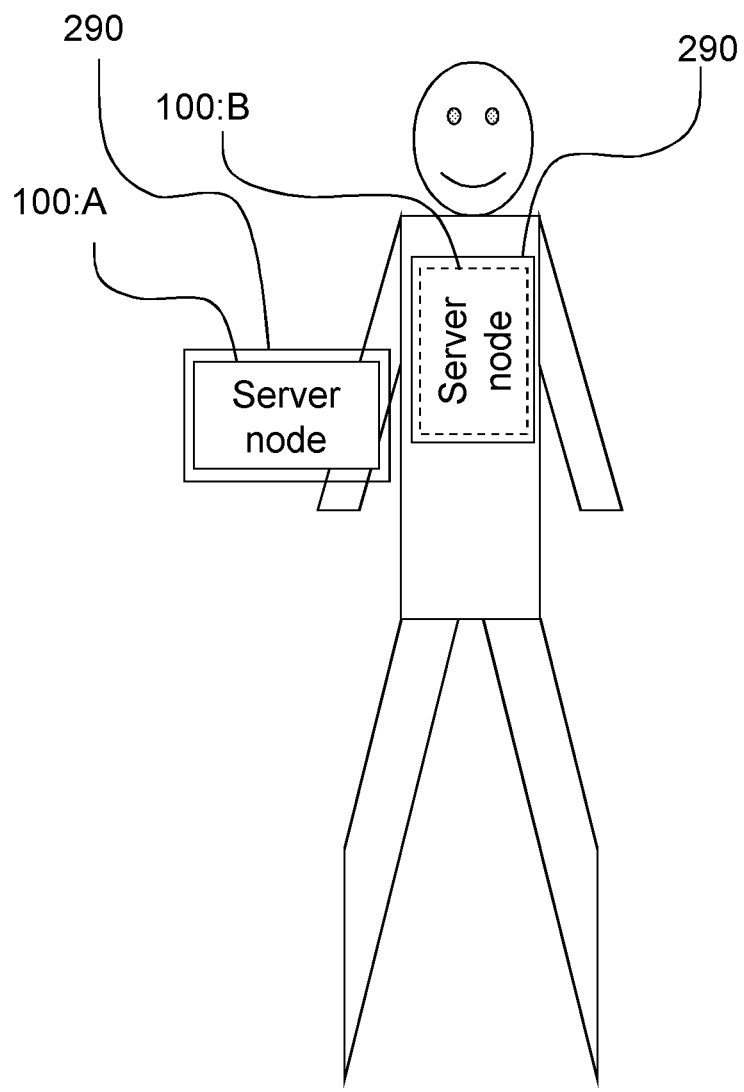
FIG. 4C illustrates further examples of a medical device associated with a body, according to further possible embodiments of the server node.

FIG. 4C shows a body associated medical device 290. According to an embodiment the medical device 290 may be arranged to perform a method according the method described for the server node 100. A medical device 290 may be various kind of equipment's in hospital environments, such as for example heart, brain, or lung function surveillance. A medical device 290 may be a device for insulin delivery, a device for respiratory assistance, or similar. A medical device 290 may be a pace maker, a position tracker, or similar.

Looking at FIG. 5, the server node 100 and the client 120 described above may be implemented, by means of program modules of a respective computer program comprising code means which, when run by processors "P" 250 causes the server node 100 and the client 120 to perform the above-described actions. The processors P 250 may comprise a single Central Processing Unit (CPU), or could comprise two or more processing units. For example, the processors P 250 may include general purpose microprocessors, instruction set processors and/or related chips sets and/or special purpose microprocessors such as Application Specific Integrated Circuits (ASICs). The processors P 250 may also comprise a storage for caching purposes.

Each computer program may be carried by computer program products "M" 260 in the server node 100 and the client 120, in the form of memories having a computer readable medium and being connected to the processor P. The computer program products may be carried by a medium 255, such as CD, DVD, flash memory, or downloadable objects. Each computer program product M 260 or memory thus comprises a computer readable medium on which the computer program is stored e.g. in the form of computer program modules "m". For example, the memories M 260 may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the server node 100 and the client 120.

The server node 100 shown in FIG. 5 further shows a communication unit 270. The communication unit 270 may be arranged for communication over wire, optical or electrical. Such wired communication may be carried by TCP/IP (Transmission Control Protocol/Internet Protocol), Ethernet, LON (local operation network), PLC (Power line communication), not limiting to other similar communication solutions. Communication unit 270 may be arranged for wireless communication. Such wireless communication may be over mobile communication (GSM/GPRS/3G/4G/5G), WiFi, Bluetooth, ZigBee, not limiting to other similar communication solutions.

According to some embodiments, where the server node 100 is a wireless node, the supply of energy may be provided from an energy storage 280, as shown in FIG. 5. The energy storage may be for example a regular battery, a fuel cell, a capacitor, a solar panel, a wind turbine, a fuel driven generator, or any combination thereof. In the scenario where the server node 100 may be grid connected, it may still be desired to preserve the energy, and reduce undesired energy consumption, since energy is a finite asset. That may as well be symbolized by the energy storage 280. The client 110 shown in FIG. 5 further shows a network interface 265. The network interface 265 may be arranged for communication over wire, optical or electrical. Such wired communication may be carried by TCP/IP (Transmission Control Protocol/Internet Protocol), Ethernet, LON (local operation network), PLC (Power line communication), not limiting to other similar communication solutions. Network interface 265 may be arranged for wireless communication. Such wireless communication may be over mobile communication (GSM/GPRS/3G/4G/5G), WiFi, Bluetooth, ZigBee, not limiting to other similar communication solutions.

FIG. 5 shows a calculation unit 290 arranged in a server node 100. The figure further shows a calculation unit arranged in a client 120. The figure shows an ID generation unit 295 arranged in an authorization engine 110. The figure shows an ID generation unit 295 arranged in a client 120.

Figure 6:
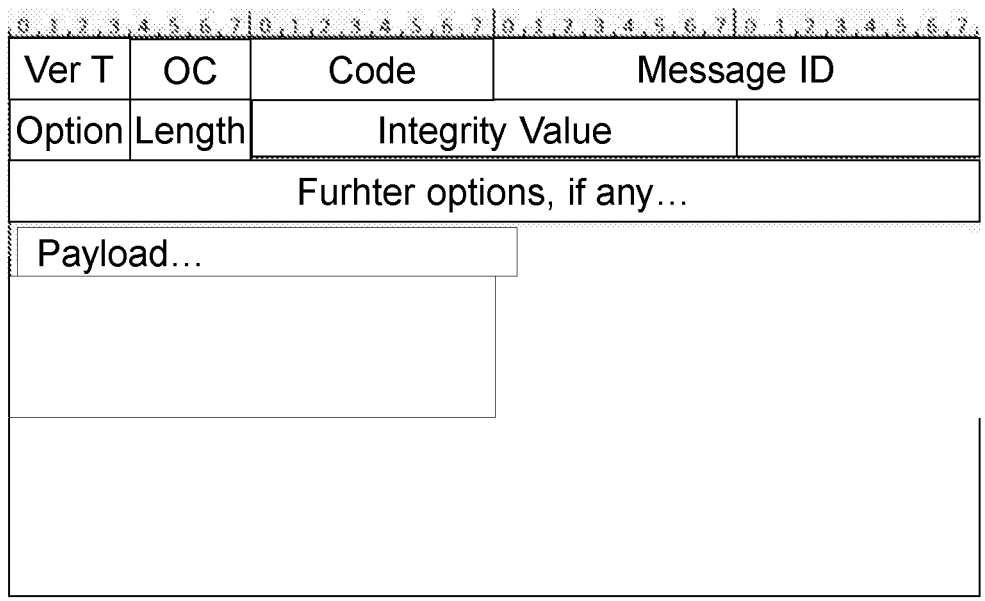
FIG. 6 is an illustrating example of a part of a message.

FIG. 6 shows an embodiment of at least a part of a message. An example shown in the figure is location of the integrity indication early in the message.

Obviously then, the message format needs to be adopted and the integrity value may appear later in the message sequence. That will of course imply a partly large parsing effort before the validity of the CoAP message can be verified.

Integrity calculation over a core message header that also contains the Message ID may be enough to include into the calculation, which also allows selection of a very fast and computational inexpensive integrity checking algorithm as earlier described. Integrity protection of a message is a different issue which not is handled in this solution. More generally for communication protocols, the introduction of a short integrity indicator in the header may allow a receiving party to evaluate with certain probability if the message is legitimate.

While the solution has been described with reference to specific exemplary embodiments, the description is generally only intended to illustrate the inventive concept and should not be taken as limiting the scope of the solution. For example, the terms "server node", "client" and "authorization engine" have been used throughout this description, although any other corresponding nodes, functions, and/or parameters could also be used having the features and characteristics described here. The solution is defined by the appended claims.

The invention claimed is:

1. A server node in a communications network adapted to reduce undesired energy consumption of the server node, wherein the server node comprises:
    a communication unit;
    a memory; and
    a processor coupled to the memory, the processor configured to:
    receive, via the communication unit, a request message from a client, the request message containing message fields comprising at least a message ID field and an integrity indication field containing a first integrity indication;
    determine a relation key by performing a calculation by usage of a master key commonly known by the server node and an authorization engine and at least data comprised in the message ID field;
    calculate a second integrity indication based on a subset of the message fields by usage of the determined relation key, wherein the subset excludes at least one message field that is predictable by a trusted client;
    verify the subset of the message fields by comparing the first and second integrity indications; and
    determine the message to be authorized when the comparison indicates equality, and
    as a result of determining that the message is not authorized, suppress reception of the message.

2. The server node according to claim 1, wherein
    the message ID and the first integrity indication are located in the beginning of the message.

3. The server node according to claim 1, wherein
    the subset comprises at least a dynamic message field, wherein
    the content of the dynamic message field is changed for subsequent request messages.

4. The server node according to claim 1, wherein the processor is further configured to determine the relation key by a function of:
    the master key, the message ID and optionally other data.

5. The server node according to claim 1, wherein:
    the processor is further configured to receive, via the communication unit, a number of not authorized request messages, wherein when the number is above a predetermined threshold during a first predefined period of time, the communication with the client is suppressed.

6. The server node according to claim 1, wherein:
    the processor is further configured to receive, via the communication unit, a number of not authorized request messages, wherein when the number is above another predetermined threshold during a second predefined period of time, the communication with the communications network is suppressed.

7. The server node according to claim 1, wherein
    the processor is further configured to suppress the communication for a secret time period, and
    the secret time period is known by the server node and the trusted clients.

8. The server node according to claim 1, wherein
    a subsequent request message comprises a new message ID relative to any previous request message during an established relation.

9. The server node according to claim 1, wherein
    a subsequent request message comprises an equal message ID relative to a previous request message, wherein
    a new relation key is determined for each subsequent request message.

10. A computer program product comprising a non-transitory computer readable medium storing a computer readable code which, when run on a server node, causes the server node to:
    receive a request message from a client by a communication unit, the request message containing message fields comprising at least a message ID field and an integrity indication field containing a first integrity indication;
    determine a relation key by performing a calculation by usage of a master key commonly known by the server node and an authorization engine and at least data comprised in the message ID field;
    calculate a second integrity indication based on a subset of the message fields by usage of the determined relation key, wherein the subset excludes at least one message field that is predictable by a trusted client;
    verify the subset of the message fields by comparing the first and second integrity indications; and
    determine the message to be authorized when the comparison indicates equality, and wherein when the message is not authorized, suppress reception of the message.

* * * * *